(12) United States Patent
Feiglin

(10) Patent No.: US 10,724,988 B2
(45) Date of Patent: Jul. 28, 2020

(54) DIGITAL MICROFLUIDICS SYSTEM WITH SWAPPABLE PCB'S

(71) Applicant: Tecan Trading AG, Mannedorf (CH)

(72) Inventor: Marc N. Feiglin, East Brunswick, NJ (US)

(73) Assignee: TECAN TRADING AG, Mannedorf (CH)

( * ) Notice: Subject to any disclaimer, the term of this patent is extended or adjusted under 35 U.S.C. 154(b) by 1356 days.

(21) Appl. No.: 13/900,712

(22) Filed: May 23, 2013

(65) Prior Publication Data

US 2013/0270114 A1  Oct. 17, 2013

Related U.S. Application Data

(63) Continuation-in-part of application No. 13/304,481, filed on Nov. 25, 2011, now Pat. No. 8,821,705.

(51) Int. Cl.
*G01N 27/447* (2006.01)
*B01L 3/00* (2006.01)

(52) U.S. Cl.
CPC ........ *G01N 27/44743* (2013.01); *B01L 3/505* (2013.01); *B01L 3/502715* (2013.01);
(Continued)

(58) Field of Classification Search
CPC ....... B01L 2200/027; B01L 2200/0673; B01L 2200/04; B01L 2300/043; B01L 2300/089;
(Continued)

(56) References Cited

U.S. PATENT DOCUMENTS 5,486,337 A  1/1996  Ohkawa
6,565,727 B1  5/2003  Shenderov
(Continued)

FOREIGN PATENT DOCUMENTS

WO  WO 2006081558  8/2006
WO  WO 2006125767  11/2006
(Continued)

OTHER PUBLICATIONS

Meaning of "cartridge" in the English Dictionary, Cambridge English Dictionary, <https://dictionary.cambridge.org/dictionary/english/cartridge>, last accessed Oct. 11, 2018.*
(Continued)

*Primary Examiner* — Maris R Kessel
(74) *Attorney, Agent, or Firm* — Notaro, Michalos & Zaccaria P.C.

(57) ABSTRACT

Digital microfluidics system manipulates samples in liquid droplets within disposable cartridges that have bottom layer, top layer, and gap between the bottom and top layers. The system has a base unit with cartridge accommodation sites and a central control unit for controlling selection of individual electrodes of electrode arrays and for providing these electrodes with individual voltage pulses for manipulating liquid droplets within the cartridges by electrowetting. The system further has board accommodation sites located at the cartridge accommodation sites that each can take up a swappable electrode board having an electrode array and electrical board contact elements individually connected to electrodes of the electrode array. Each board accommodation site has electrical base unit contact elements that are connected to the central control unit and that are configured to engage with the electrical board contact elements of a swappable electrode board that is placed at the board accommodation site.

23 Claims, 4 Drawing Sheets

Figure 1:
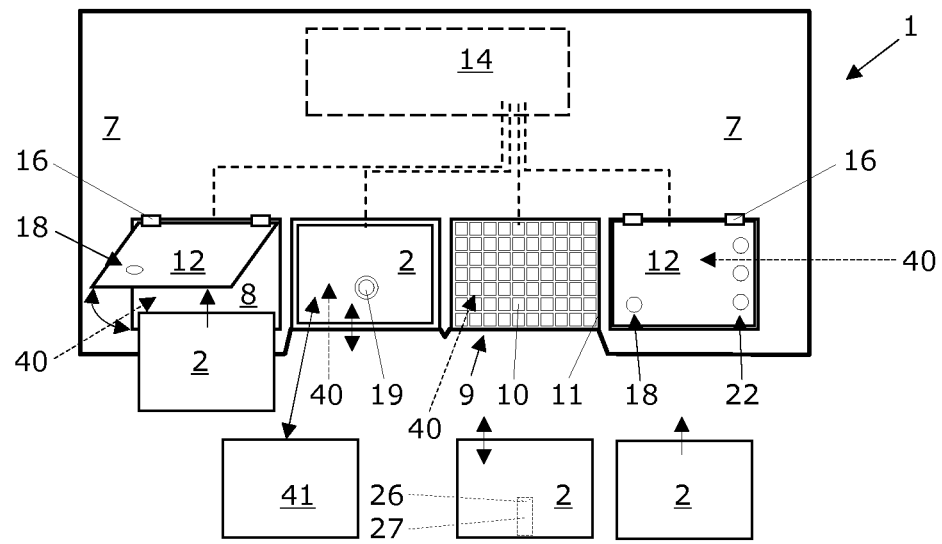

(52) U.S. Cl.
CPC .. *B01L 3/502792* (2013.01); *G01N 27/44791* (2013.01); *B01L 2200/027* (2013.01); *B01L 2200/04* (2013.01); *B01L 2200/0673* (2013.01); *B01L 2300/043* (2013.01); *B01L 2300/044* (2013.01); *B01L 2300/089* (2013.01); *B01L 2300/123* (2013.01); *B01L 2400/0427* (2013.01)

(58) Field of Classification Search
CPC ..... B01L 2400/0415; B01L 2400/0427; B01L 3/502715; B01L 3/502792; B01L 3/505; B01L 3/5055; G01N 27/44791; G01N 27/44743
See application file for complete search history.

(56) References Cited

U.S. PATENT DOCUMENTS

| | | | | |
|---|---|---|---|---|
| 2007/0023292 | A1* | 2/2007 | Kim | B01F 13/0076 204/643 |
| 2007/0243634 | A1* | 10/2007 | Pamula | B01F 13/0071 436/518 |
| 2008/0230386 | A1* | 9/2008 | Srinivasan | C07K 1/1136 204/450 |
| 2008/0281471 | A1 | 11/2008 | Smith et al. | |
| 2009/0298059 | A1 | 12/2009 | Gumbrecht et al. | |
| 2010/0282608 | A1* | 11/2010 | Srinivasan | B01L 3/502792 204/450 |
| 2012/0264932 | A1* | 10/2012 | Van Dam | B01J 19/0093 536/122 |
| 2013/0020202 | A1 | 1/2013 | Feiglin et al. | |
| 2013/0118900 | A1 | 5/2013 | Reimitz et al. | |

FOREIGN PATENT DOCUMENTS

| | | | |
|---|---|---|---|
| WO | WO 2008106678 | 9/2008 | |
| WO | WO 2010037763 A1 * | 4/2010 | ........ B01L 3/502784 |
| WO | WO 2010069977 | 6/2010 | |
| WO | WO 2011002957 | 1/2011 | |
| WO | 2 548 646 | 1/2013 | |

OTHER PUBLICATIONS

Pollack, M.G., et al.; Electrowetting-based actuation of droplets for integrated microfluidics; The Royal Society of Chemistry, Lab Chip, 2002, 2, 96-101.

Washizu, Masao; Electrostatis Actuation of Liquid Droplets for Microreactor Applications; IEEE Transactions on Industry Applications, vol. 34, No. 4, Jul./Aug. 1998, pp. 732-737.

Yang, Hanping, et al.; Connecting interface for modularization of digital microfluidics; Proc. of SPIE vol. 6886, 68860L-1, (2008).

International Search Report for PCT/EP2013/060585.

* cited by examiner

DIGITAL MICROFLUIDICS SYSTEM WITH SWAPPABLE PCB'S

RELATED PATENT APPLICATIONS

This patent application is a Continuation In Part application to the U.S. patent application Ser. No. 13/304,481 filed on Nov. 25, 2011, the disclosure of which being herein incorporated in its entirety.

FIELD OF TECHNOLOGY

The present invention relates to a digital microfluidics system or device into which one or more disposable cartridges for manipulating samples in liquid droplets therein can be inserted. The digital microfluidics system comprises an electrode array supported by a substrate, and a central control unit for controlling the selection of individual electrodes of this electrode array and for providing them with individual voltage pulses for manipulating liquid droplets by electrowetting. Thus, the invention also relates to droplet actuator devices for facilitating droplet actuated molecular techniques. This technical field generally relates to the control and manipulation of liquids in a small volume, usually in the micro- or nanoscale format.

RELATED PRIOR ART

Automated liquid handling systems such as the Freedom EVO® robotic workstation from the present applicant (Tecan Schweiz AG, Seestrasse 103, CH-8708 Männedorf, Switzerland) are generally well known in the art. This device enables automated liquid handling in a stand-alone instrument or in automated connection with an analytical system. These automated systems are not designed to be portable and typically require larger volumes of liquids (microliter to milliliter) to process. In digital microfluidics, a defined voltage is applied to electrodes of an electrode array, so that individual droplets are addressed (electrowetting). For a general overview of the electrowetting method, please see Washizu, IEEE Transactions on Industry Applications, Volume 34, No. 4, 1998, and Pollack et al., Lab chip, 2002, Volume 2, 96-101. Briefly, electrowetting refers to a method to move liquid droplets using arrays of microelectrodes, preferably covered by a hydrophobic layer. By applying a defined voltage to electrodes of the electrode array, a change of the surface tension of the liquid droplet, which is present on the addressed electrodes, is induced. This results in a remarkable change of the contact angle of the droplet on the addressed electrode, hence in a movement of the droplet. For such electrowetting procedures, two principle ways to arrange the electrodes are known: using one single surface with an electrode array for inducing the movement of droplets or adding a second surface that is opposite a similar electrode array and that provides at lest one ground electrode. A major advantage of the electrowetting technology is that only a small volume of liquid is required, e.g. a single droplet. Thus, liquid processing can be carried out within considerably shorter time. Furthermore the control of the liquid movement can be completely under electronic control resulting in automated processing of samples.

A device for liquid droplet manipulation by electrowetting using one single surface with an electrode array (a monoplanar arrangement of electrodes) is known from the U.S. Pat. No. 5,486,337. All electrodes are placed on a surface of a carrier substrate, lowered into the substrate, or covered by a non-wettable surface. A voltage source is connected to the electrodes. The droplet is moved by applying a voltage to subsequent electrodes, thus guiding the movement of the liquid droplet above the electrodes according to the sequence of voltage application to the electrodes.

An electrowetting device for microscale control of liquid droplet movements, using and electrode array with an opposing surface with at least one ground electrode of is known from U.S. Pat. No. 6,565,727 (a biplanar arrangement of electrodes). Each surface of this device may comprise a plurality of electrodes. The two opposing arrays form a gap. The surfaces of the electrode arrays directed towards the gap are preferably covered by an electrically insulating, hydrophobic layer. The liquid droplet is positioned in the gap and moved within a non-polar filler fluid by consecutively applying a plurality of electric fields to a plurality of electrodes positioned on the opposite sites of the gap.

Containers with a polymer film for manipulating samples in liquid droplets thereon are known from WO 2010/069977 A1: A biological sample processing system comprises a container for large volume processing and a flat polymer film with a lower surface and a hydrophobic upper surface. The flat polymer film is kept at a distance to a base side of the container by protrusions. This distance defines at least one gap when the container is positioned on the film. A liquid droplet manipulation instrument comprises at least one electrode array for inducing liquid droplet movements. A substrate supporting the at least one electrode array is also disclosed as well as a control unit for the liquid droplet manipulation instrument. The container and the film are reversibly attached to the liquid droplet manipulation instrument. The system thus enables displacement of at least one liquid droplet from the at least one well through the channel of the container onto the hydrophobic upper surface of the flat polymer film and above the at least one electrode array. The liquid droplet manipulation instrument is accomplished to control a guided movement of said liquid droplet on the hydrophobic upper surface of the flat polymer film by electrowetting and to process there the biological sample.

The use of such an electrowetting device for manipulating liquid droplets in the context of the processing of biological samples is also known from the international patent application published as WO 2011/002957 A2. There, it is disclosed that a droplet actuator typically includes a bottom substrate with the control electrodes (electrowetting electrodes) insulated by a dielectric, a conductive top substrate, and a hydrophobic coating on the bottom and top substrates. Also disclosed are droplet actuator devices for replacing one or more components of a droplet actuator, i.e. disposable components. From this international application, droplet actuators with a fixed bottom substrate (e.g. of a PCB), with electrowetting electrodes, and with a removable or replaceable top substrate are known. A self-containing cartridge may e.g. include buffers, reagents, and filler fluid. Pouches in the cartridge may be used as fluid reservoirs and may be punctured to release fluid (e.g. a reagent or oil) into a cartridge gap. The cartridge may include a ground electrode, which may be replaced by a hydrophobic layer, and an opening for loading samples into the gap of the cartridge. Interface material (e.g. a liquid, glue or grease) may provide adhesion of the cartridge to the electrode array.

Disposable cartridges for microfluidic processing and analysis in an automated system for carrying out molecular diagnostic analysis are disclosed in WO 2006/125767 A1 (see US 2009/0298059 A1 for an English translation). The cartridge is configured as a flat chamber device (with about the size of a check card) and can be inserted into the system. A sample can be pipetted into the cartridge through a port.

OBJECTS AND SUMMARY OF THE PRESENT INVENTION

It is an object of the present invention to suggest an alternative digital microfluidics system or digital microfluidics device which is configured to accommodate one or more disposable cartridges for manipulating samples in liquid droplets therein. This object is achieved in that a digital microfluidics system for manipulating samples in liquid droplets within disposable cartridges is proposed. Such a disposable cartridge preferably contains a bottom layer, a top layer, and a gap between the bottom and top layers.

The digital microfluidics system according to the present invention comprises:
(a) a base unit with at least one cartridge accommodation site that is configured for taking up a disposable cartridge;
(b) at least one electrode array substantially extending in a first plane and comprising a number of individual electrodes, said at least one electrode array being supported by a bottom substrate; and
(c) a central control unit for controlling the selection of the individual electrodes of said at least one electrode array and for providing these electrodes with individual voltage pulses for manipulating liquid droplets within said cartridges by electrowetting.

The digital microfluidics system according to the present invention is characterized in that it further comprises at least one board accommodation site that is located at one of said cartridge accommodation sites of the base unit; each board accommodation site being configured to take up a swappable electrode board comprising an electrode array and a number of electrical board contact elements that are electrically connected to the individual electrodes of said electrode array; each board accommodation site comprising a multitude of electrical base unit contact elements that are electrically connected to said central control unit, the electrical base unit contact elements being configured to engage with the electrical board contact elements of a swappable electrode board that is placed at said board accommodation site.

Preferably, the at least one board accommodation site is located below one of said cartridge accommodation sites of the base unit and is configured to take up a swappable electrode board that is inserted into the base unit of the digital microfluidics system. Additional preferred embodiments of the digital microfluidics system according to the present invention are herein disclosed as well.

Preferably, the digital microfluidics system is configured to receive one or more disposable cartridges that can be inserted into the base unit of the digital microfluidics system. It is further preferred that the digital microfluidics system comprises at least one disposable cartridge for manipulating samples in liquid droplets using the digital microfluidics system or device. It is further preferred that the bottom layer and the top layer of the cartridge comprise a hydrophobic surface that is exposed to the gap of the cartridge and that the cartridge does not have a conductive layer.

Preferably, the digital microfluidics system comprises at least one cover plate with a top substrate, the at least one cover plate being located at said cartridge accommodation site(s). The at least one cover plate further comprising an electrically conductive material, which extends in a second plane and substantially parallel to the electrode array of the cartridge accommodation site the at least one cover plate is assigned to. The electrically conductive material of the at least one cover plate is not connected with a source of an electrical potential. Preferably, the electrically conductive material of the cover plate is a conductive foil that is attached to the cartridge.

According to a first preferred variant of the cartridge accommodation site, the cover plate is configured to be movable with respect to the electrode array of the respective cartridge accommodation site. According to a second preferred variant, the cartridge accommodation sites are configured for receiving a slidingly inserted disposable cartridge that is movable in a direction substantially parallel with respect to the electrode array of the respective cartridge accommodation site.

Preferably, the digital microfluidics system comprises at least one swappable electrode board comprising an electrode array that is supported by a bottom substrate, and that comprises a number of electrical board contact elements which are electrically connected to the individual electrodes of said electrode array.

It is an additional object of the present invention to suggest a means for technically adapting an alternative digital microfluidics system for carrying out different assays inside disposable cartridges for manipulating samples in liquid droplets using the digital microfluidics system or device. This additional object is achieved by suggesting at least one swappable electrode board that is configured to be placed at the board accommodation sites of the digital microfluidics system. The at least one swappable electrode board comprises an electrode array that is supported by a bottom substrate and a number of electrical board contact elements that are electrically connected to the individual electrodes of said electrode array. The at least one swappable electrode board is configured to be placed at one of said board accommodation sites of the digital microfluidics system; the electrical board contact elements being configured to engage with the electrical base unit contact elements of the base unit that are electrically connected to said central control unit of said digital microfluidics system.

Preferably, the bottom substrate that supports the electrode array is configured as a printed circuit board (PCB) and the electrical board contact elements are located in groups and close to one or more borders of the PCB. It is preferred that the individual electrodes of said electrode array are arranged and configured for manipulating liquid droplets within cartridges by electrowetting and for carrying out a particular assay. It especially preferred that at least the electrode array of the swappable electrode board is covered by a dielectric layer.

It is yet a further object of the present invention to suggest alternative methods for manipulating samples in liquid droplets in a digital microfluidics system or device. This further object is achieved in that a method for manipulating samples in liquid droplets that adhere to a hydrophobic surface is proposed.

A first method according to the present invention comprises the steps of:
(a) providing a digital microfluidics system according to the present invention;
(b) providing a cartridge as herein described; and
(c) providing a swappable electrode board as herein described,
wherein the swappable electrode board comprises an electrode array that is configured for carrying out a particular assay within the gap of the cartridge, during which assay samples in liquid droplets that adhere to a hydrophobic surface are manipulated within the gap by electrowetting.

A second method according to the present invention comprises the steps of:

(a) providing a digital microfluidics system as herein described;
(b) providing a cartridge as herein described; and
(c) selecting a swappable electrode board according to the present invention, wherein the swappable electrode board comprises an electrode array that is configured for carrying out a particular assay within the gap of the cartridge, during which assay samples in liquid droplets that adhere to a hydrophobic surface are manipulated within the gap by electrowetting.

Additional and inventive features and preferred embodiments and variants of the digital microfluidics system, the swappable electrode board, and the method for manipulating samples in liquid droplets derive from the specification and the dependent claims.

Advantages of the present invention comprise:

Providing swappable electrode boards renders a digital microfluidics system extremely flexible with respect to different assays that can be performed in disposable cartridges that are placed above such swappable electrode boards, because each swappable electrode board can be specifically designed for carrying out one particular assay. Thus complex and expensive designs of electrode arrays that must serve for a large number of purposes can be avoided by providing much simpler swappable electrode boards at an affordable price.

An instrument with swappable electrode boards provides greater flexibility and lower cost than designing a disposable digital microfluidics cartridge with an integrated PCB. By placing the assay specific features on the swappable PCB rather than in the disposable cartridge, a simpler cartridge that is generic for multiple assays can be utilized. Both the increased simplicity (by removing the PCB) and the ability to manufacture larger numbers of cartridges (as they are generic for use in many different assays) enable a lower manufacturing cost. The flexibility of performing multiple assays is provided through the ability to swap electrode boards.

A damaged or non-functional swappable electrode board can easily be replaced without any use of special tools and without any need for a maintenance specialist.

Providing a digital microfluidics system with at least on board accommodation site for taking up a swappable electrode board opens up the possibility for utilizing the same digital microfluidics system for carrying out future assays that have not been developed yet.

Covering at least the electrode array of a swappable electrode board with a dielectric layer provides additional protection against oxidation or fingerprints to the sensitive surface of the electrode array.

The disposable cartridges can be configured as simple consumables that provide the working layers and the gap between and for carrying out the assay defined by the swappable electrode boards. The working layers of the cartridge prevent the swappable electrode boards and the entire digital microfluidics system from being contaminated.

The concept of the "swappable PCB" is that the expensive components that are common to many biochemical assays remain in the instrument. For example, a digital microfluidics system comprises the following:

A swappable PCB designed for a specific group of assays (e.g. molecular biology) comprising for example:
  a top layer with a pattern of electrodes that define the assay capabilities,
  a second layer with the wiring tracing for powering each electrode,
  a third layer with thin traces that provide heating in specified areas,
  a fourth layer with an integrated thermocouple for measuring and controlling the temperature of specified areas, and
  a substrate that carries all layers and their electrical contact points;
A high-voltage power relay module to control turning on and off of the PCB electrodes;
A power supply to power the entire system;
An optics module (e.g. for fluorescence detection);
A clamping and/or vacuum module for holding a cartridge in place on the PCB;
A magnet actuator that moves a permanent magnet towards and away from the bottom of the PCB (permanent magnets provide more focused and stronger magnetic field than electromagnets);
A analog/digital I/O module to control digital outputs (i.e. magnet actuators, heaters, vacuum, etc) and inputs (thermocouples, etc)
A power module to provide power to the system; and
An embedded processor to run the system, the processor comprising:
  software and user interface.

According to the current invention, a digital microfluidics system is proposed as an "instrument platform" that contains all of the expensive full bulleted items above and that can be used for almost any biochemical application. By changing or varying the empty bulleted items only, "different instruments" or even "new instruments" may be created for carrying out entirely different applications.

This concept offers two significant advantages:

1. A manufacturer may produce a large number of instrument platforms or digital microfluidics systems respectively (see full bulleted items above) at considerably reduced costs because of the large number. Adding selected variable items (i.e. a selection of empty bulleted items, see above) to defined numbers of instrument platforms on stock will result in a variety of digital microfluidics systems that each are dedicated for a particular use. Replacing selected variable items (i.e. a selection of empty bulleted items, see above) in some of the already produced instrument platforms will result in a different variety of new digital microfluidics systems that each are dedicated for a new particular use.

2. A user may purchase a single instrument platform dedicated for a particular use (e.g. as an instrument for measuring a particular analyte in a blood sample). If the user decides to carry out a different experiment or assay, he simply may replace the respective variable items (i.e. a selection of empty bulleted items, see above) what will result in a new digital microfluidics systems that is dedicated for a new particular use (e.g. as an instrument for analyzing genes in a blood sample). For e.g. carrying out ELISA assays, the PCB may be swapped and the software updated so that the instrument becomes an immunoassay system.

In both these cases, the PCB can be designed so that the software is actually contained on a chip on the PCB so that the software is automatically updated when the PCB is swapped.

According to the current invention, the digital microfluidics system is proposed as a multi level "instrument platform". On a first level, the base unit of the digital microfluidics system is the same for all applications utilizing electrowetting techniques. Thus, a generic instrument is created, where expensive, but common modules, remain in the base unit of the instrument, and where great flexibility is provided by replaceable parts such as insertable PCBs and insertable cartridges. On a second level, the PCB is a replaceable element which can be replaced by the manufacturer or the end-user. The electrode array of a replaced PCB interfaces with the base unit by contact sites so that droplet movement inside a cartridge that is placed on top of the PCB is precisely controlled. Preferably, the contact sites on the PCB and in the base unit are standardized. On a third level, different cartridge types preloaded with a different set of reagents can be utilized. For the same assay the same type of cartridge may be used, but different samples introduced.

BRIEF INTRODUCTION OF THE DRAWINGS

Figure 2:
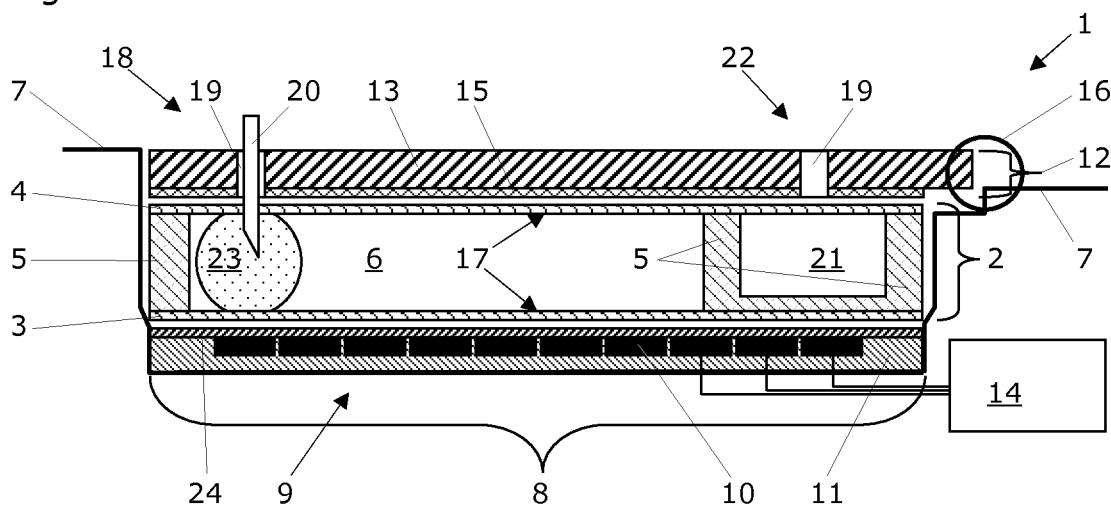
Figure 3:
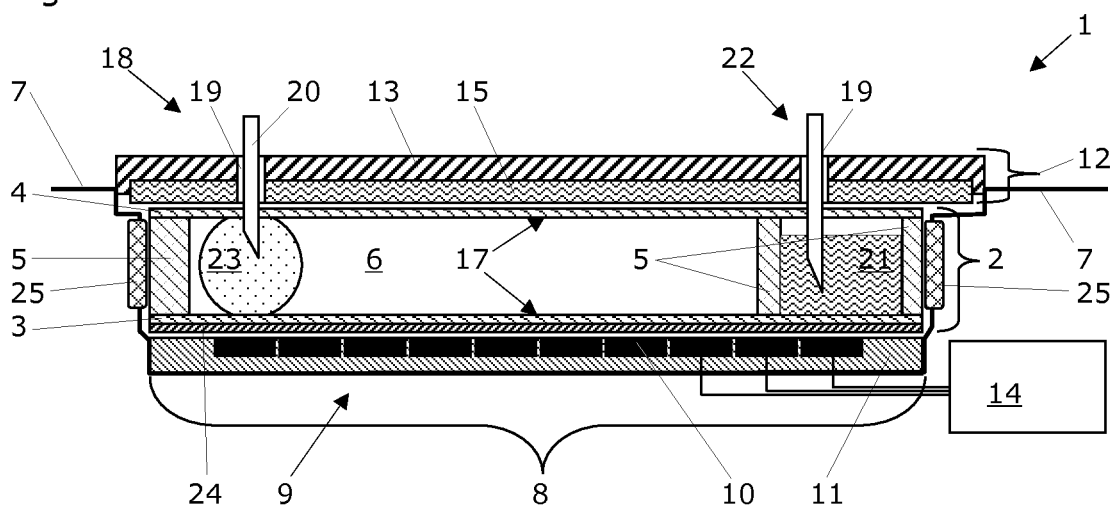
Figure 4:
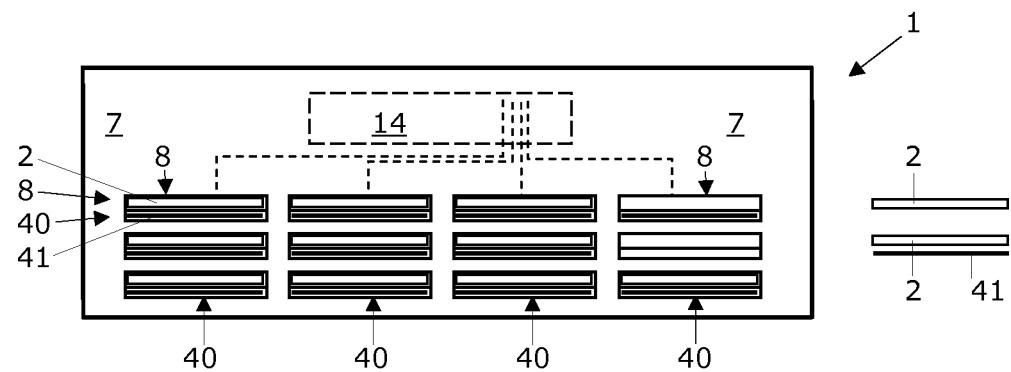
Figure 5A:
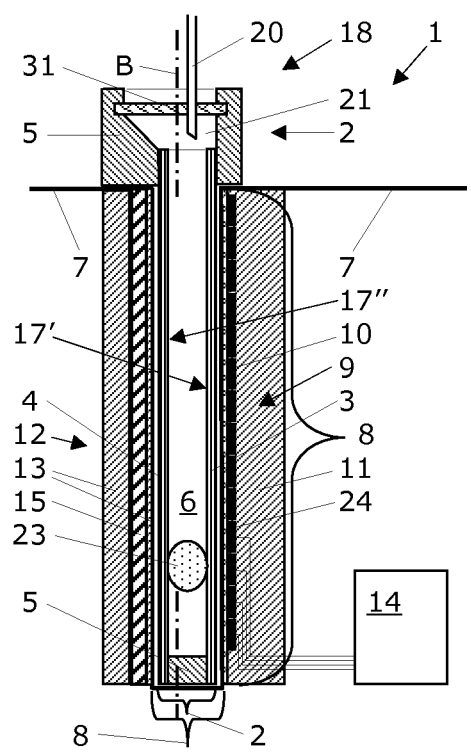
Figure 5B:
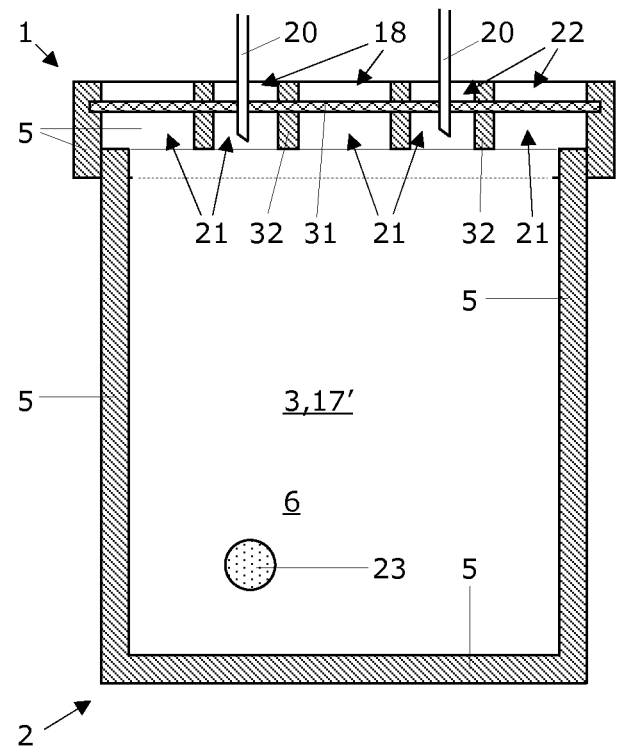
Figure 6:
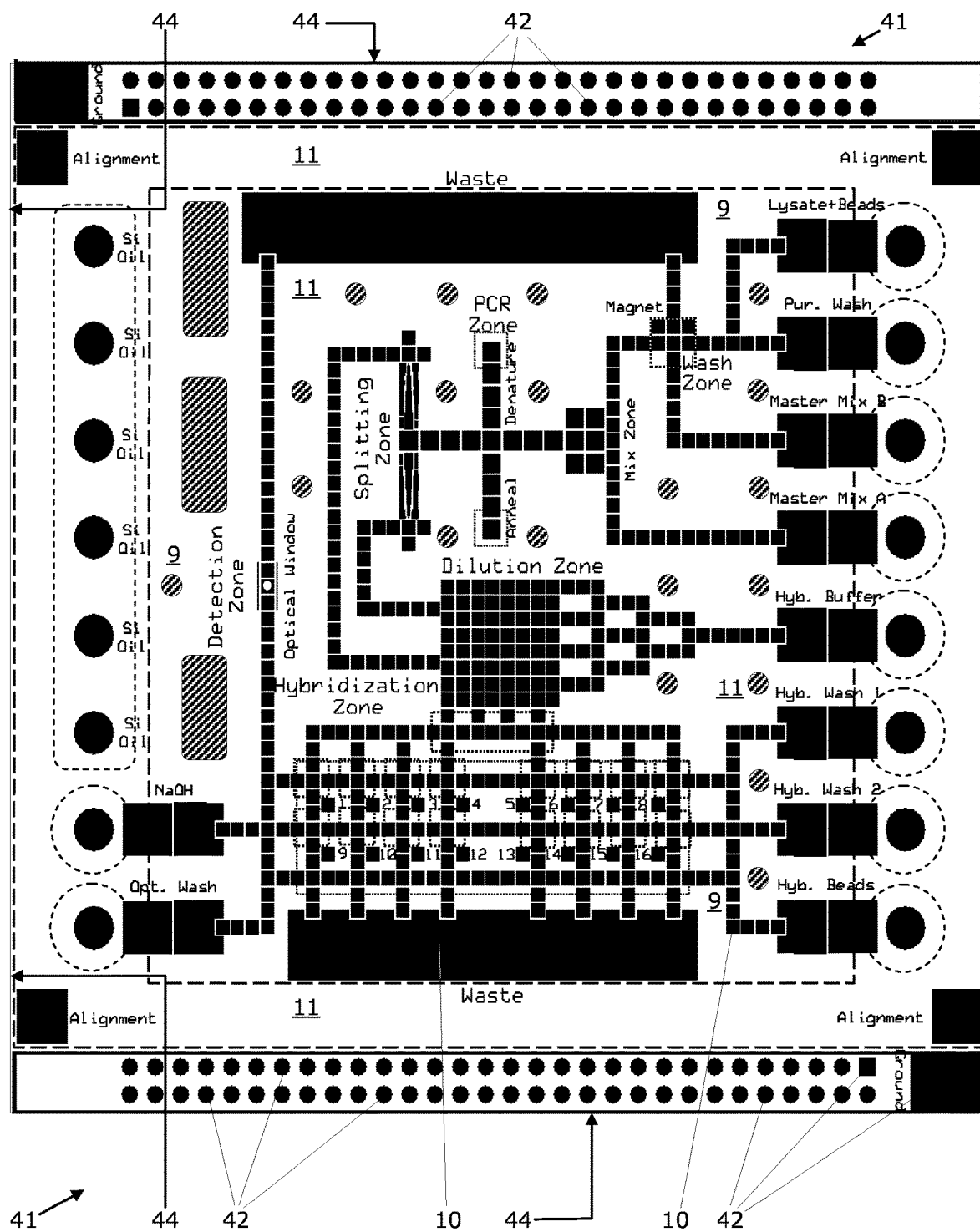
Figure 7:
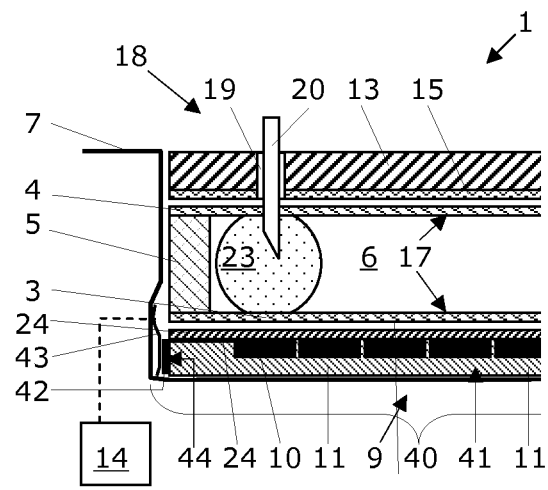
Figure 8:
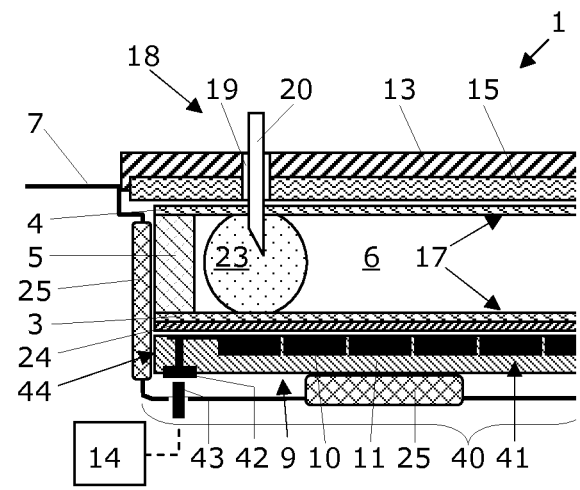
Figure 9:
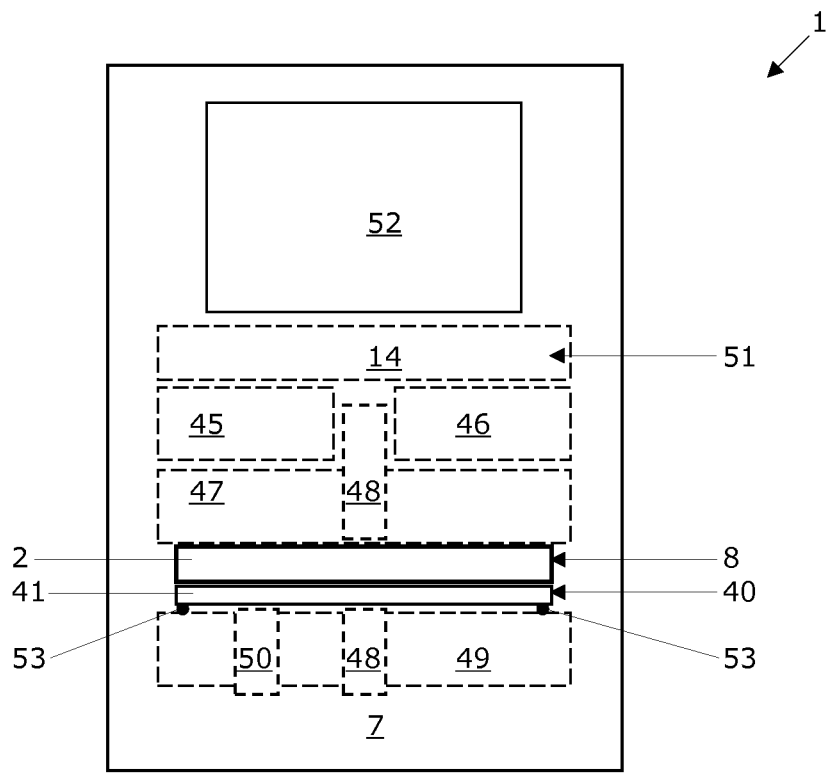

The digital microfluidics system, a selection of swappable electrode boards, the self-contained disposable cartridge, and the method for manipulating samples according to the present invention are explained with the help of the attached schematic drawings that show selected and exemplary embodiments of the present invention without narrowing the scope and gist of this invention. It is shown in:

FIG. 1 an overview over a digital microfluidics system that is equipped with a central control unit and a base unit, with four cartridge accommodation sites and with four board accommodation sites for receiving a swappable electrode board that each comprises an electrode array;

FIG. 2 a section view of one cartridge accommodation site with a disposable cartridge according to a first embodiment accommodated therein; the electrode array being located on a fixed bottom substrate;

FIG. 3 a section view of one cartridge accommodation site with a disposable cartridge according to a second embodiment accommodated therein; the electrode array being located on a fixed bottom substrate;

FIG. 4 an overview over a digital microfluidics system that is equipped with a central control unit and a base unit, with twelve cartridge accommodation sites that each comprises a fixed cover plate and with twelve board accommodation sites for receiving a swappable electrode board that each comprises an electrode array;

FIG. 5 section views of one cartridge accommodation site with a disposable cartridge according to a third embodiment accommodated therein, wherein:

FIG. 5A shows a top-entry cartridge inserted into a substantially vertical cartridge accommodation site with a substantially vertical electrode array and cover plate, and FIG. 5B shows the top-entry cartridge as viewed from the section plane B indicated in FIG. 5A;

FIG. 6 an overview over a swappable electrode board that is insertable into a digital microfluidics system; the bottom substrate of this swappable electrode board is configured as a printed circuit board (PCB);

FIG. 7 a section detail according to FIG. 2; here, the electrode array being located on a swappable electrode board according to a first embodiment of electrically contacting;

FIG. 8 a section detail according to FIG. 3; here, the electrode array being located on a swappable electrode board according to a second embodiment of electrically contacting;

FIG. 9 a schematic view of a generic multi level "instrument platform" comprising a standardized base unit with all common modules; the "instrument platform" further comprising a replaceable PCB and a replaceable cartridge that are adapted for a particular experiment or assay.

DETAILED DESCRIPTION OF THE PRESENT INVENTION

The FIG. 1 shows an overview over an exemplary digital microfluidics system 1 that is equipped with a central control unit 14 and a base unit 7, with four cartridge accommodation sites 8 that each comprise an electrode array 9, and a cover plate 12. The digital microfluidics system 1 is configured for manipulating samples in liquid droplets 23 within disposable cartridges 2 that contain a bottom layer 3, a top layer 4, and eventually a spacer 5 that defines a gap 6 between the bottom and top layers 3,4. Accordingly, the samples in liquid droplets 23 are manipulated in the gap 6 of the disposable cartridge 2. This digital microfluidics system 1 according to the present invention also comprises four board accommodation sites 40 for receiving a swappable electrode board 41.

The digital microfluidics system 1 comprises a base unit 7 with at least one cartridge accommodation site 8 that is configured for taking up a disposable cartridge 2. The digital microfluidics system 1 can be a stand alone and immobile unit, on which a number of operators is working with cartridges 2 that they bring along. The digital microfluidics system 1 thus may comprise a number of cartridge accommodation sites 8 and a number of electrode arrays 9 at least some of which are located on swappable electrode boards 41, so that a number of cartridges 2 can be worked on simultaneously and/or parallel. The number of cartridge accommodation sites 8 and board accommodation sites 40 may be 1 or any number between e.g. 1 and 100 or even more; this number e.g. being limited by the working capacity of the central control unit 14.

It may be preferred to integrate the digital microfluidics system 1 into a liquid handling workstation or into a Freedom EVO® robotic workstation, so that a pipetting robot can be utilized to transfer liquid portions and/or sample containing liquids to and from the cartridges 2. Alternatively, the system 1 can be can be configured as a hand held unit which only comprises and is able to work with a low number, e.g. a single disposable cartridge 2. Every person of skill will understand that intermediate solutions that are situated in-between the two extremes just mentioned will also operate and work within the gist of the present invention.

According to the present invention, the digital microfluidics system 1 also comprises at least one board accommodation site 40 for taking up a swappable electrode board 41 which comprises an electrode array 9 that substantially extends in a first plane and that comprises a number of individual electrodes 10. Such a swappable electrode board 41 preferably is located at each one of said cartridge accommodation sites 8 of the base unit 7. Preferably each electrode array 9 is supported by a bottom substrate 11. It is noted that the expressions "electrode array", "electrode layout", and "printed circuit board (PCB)" are utilized herein as synonyms.

The digital microfluidics system 1 may also comprise at least one cover plate 12 with a top substrate 13; though providing of such cover plates 12 is particularly preferred, at least some of the cover plates may be dispensed with or may be replaced by an alternative cover for holding a disposable cartridge 2 in place inside the base unit of the microfluidics system 1. Thus, at least one cover plate 12 may be located at one of said cartridge accommodation sites 8. The top substrate 13 of the cover plate 12 and the bottom substrate 11 with the electrode array 9 or PCB define a space or cartridge accommodation site 8 respectively. In a first variant (see the two cartridge accommodation sites 8 in the middle of the base unit 7, the cartridge accommodation sites 8 are configured for receiving a slidingly inserted disposable cartridge 2 that is movable in a direction substantially parallel with respect to the electrode array 9 of the respective cartridge accommodating site 8. Such front- or top-loading can be supported by a drawing-in automatism that, following a partial insertion of a disposable cartridge 2, transports the cartridge 2 to its final destination within the cartridge accommodation site 8, where the cartridge 2 is precisely seated. Preferably, these cartridge accommodation sites 8 do not comprise a movable cover plate 12. After carrying out all intended manipulations to the samples in liquid droplets, the used cartridges 2 can be ejected by the drawing-in automatism and transported to an analysis station or discarded.

In a second variant (see the two cartridge accommodation sites 8 on the right and left of the base unit 7), the cartridge accommodation sites 8 comprise a cover plate 12 that is configured to be movable with respect to the electrode array 9 of the respective cartridge accommodating site 8. The cover plate 12 preferably is configured to be movable about one or more hinges 16 and/or in a direction that is substantially normal to the electrode array 9.

Similar to the possibilities for inserting a disposable cartridge 2 into a cartridge accommodation site 8, possibilities for inserting a swappable electrode board 41 into a board accommodation site 40 comprise the following alternatives:
(a) vertically lowering the swappable electrode board 41 through the respective cartridge accommodation site 8 and into the board accommodation site 40;
(b) horizontally sliding the swappable electrode board 41 below the respective cartridge accommodation site 8 and into the board accommodation site 40;
(c) horizontally sliding the swappable electrode board 41 below the respective cartridge accommodation site 8 and substantially vertically lifting into the board accommodation site 40.

In FIG. 1, there is drawn only one swappable electrode board 41 that slidingly can be inserted by front loading below the second cartridge accommodation site 8 (as counted from the left). All possible places for locating a board accommodation site 40 are indicated and pointed to by dashed arrows.

The digital microfluidics system 1 also comprises a central control unit 14 for controlling the selection of the individual electrodes 10 of said at least one electrode array 9 and for providing these electrodes 10 with individual voltage pulses for manipulating liquid droplets within said cartridges 2 by electrowetting. As partly indicated in FIG. 1, every single individual electrode 10 is operatively connected to the central control unit 14 and therefore can be independently addressed by this central control unit 14, which also comprises the appropriate sources for creating and providing the necessary electrical potentials in a way known in the art.

The at least one cover plate 12 preferably comprises an electrically conductive material 15 that extends in a second plane and substantially parallel to the electrode array 9 of the cartridge accommodation site 8 the at least one cover plate 12 is assigned to. It is particularly preferred that this electrically conductive material 15 of the cover plate 12 is configured to be not connected to a source of an electrical ground potential. The applicants of the current invention found that the conductive material 15 also contributes to the electrowetting movements of the liquid droplets manipulated in the digital microfluidics system 1, if there is no connection between the conductive material 15 of the cover plate 12 and any source of a certain electrical (e.g. ground) potential. Thus, the cover plate 12 can be configured to be movable in any arbitrary direction and no electrical contacts have to be taken in into consideration when selecting a particularly preferred movement of the cover plate 12. Thus, the cover plate 12 may be configured to be also movable in a direction substantially parallel to the electrode array 9 and for carrying out a linear, circular or any arbitrary movement with respect to the respective electrode array 9 of the base unit 7.

The FIG. 2 shows a section view of one exemplary cartridge accommodation site 8 with a disposable cartridge 2 according to a first embodiment accommodated therein. The cover plate 12 is mechanically connected with the base unit 7 of the digital microfluidics system 1 via a hinge 16; thus, the cover plate 12 can swing open and a disposable cartridge 2 can be placed on the cartridge accommodation site 8 via top-entry loading (see FIG. 1). The electrically conductive material 15 of the cover plate 12 is configured as a thin metal plate or metal foil that is attached to the top substrate 13. Alternatively, the electrically conductive material 15 of the cover plate 12 is configured as a metal layer that is deposited onto the top substrate 13. Such deposition of the conductive material 15 may be carried out by chemical or physical vapor deposition techniques as they are known per se.

The cover plate 12 is configured to apply a force to a disposable cartridge 2 that is accommodated at the cartridge accommodation site 8 of the base unit 7. This force urges the disposable cartridge 2 against the electrode array 9 in order to position the bottom layer 3 of the cartridge as close as possible to the surface of the electrode array 9. This force also urges the disposable cartridge 2 into the perfect position on the electrode array 9 with respect to a piercing facility 18 of the cover plate 12. This piercing facility 18 is configured for introducing sample droplets into the gap 6 of the cartridge 2. The piercing facility 18 is configured as a through hole 19 that leads across the entire cover plate 12 and that enables a piercing pipette tip 20 to be pushed through and pierce the top layer 4 of the cartridge 2. The piercing pipette tip 20 may be a part of a handheld pipette (not shown) or of a pipetting robot (not shown).

In the case shown in FIG. 2, the electrode array 9 is covered by a dielectric layer 24. The electrode array 9 is fixed to a bottom substrate 11 and every individual electrode 10 is electrically and operationally connected with the central control unit 14 (only three connections of the ten electrodes 10 are drawn here). The electrode array 9 is located on an immovably fixed bottom substrate 11. The digital microfluidics system 1 is configured for manipulating samples in liquid droplets 23 within disposable cartridges 2 that contain a gap 6. Accordingly, the samples in liquid droplets 23 are manipulated in the gap 6 of the disposable cartridge 2. The disposable cartridge 2 comprises a bottom layer 3, a top layer 4, and a spacer 5 that defines a gap 6 between the bottom and top layers 3,4 for manipulating samples in liquid droplets 23 in this gap 6. The bottom layer 3 and the top layer 4 comprise a hydrophobic surface 17 that is exposed to the gap 6 of the cartridge 2. The bottom layer 3 and the top layer 4 of the cartridge 2 are entirely hydrophobic films or at least comprise a hydrophobic surface that is exposed to the gap 6 of the cartridge 2. It is clear from this FIG. 2, that the cartridge 2 does not have a conductive layer. The spacer 5 of the cartridge 2 here at least partially is configured as a body that includes compartments 21 for reagents needed in an assay that is applied to the sample droplets in the gap 6.

The FIG. 3 shows a section view of one exemplary cartridge accommodation site 8 with a disposable cartridge 2 according to a second embodiment accommodated therein. Different to the previous embodiment, the cover plate 12 is mechanically connected with the base unit 7 of the digital microfluidics system 1 and immovably fixed therewith. The electrically conductive material 15 of the cover plate 12 is configured as a thick metal plate that is attached to the top substrate 13. Here, the cover plate 12 is not configured to apply a force to the disposable cartridge 2 that is accommodated at the cartridge accommodation site 8 of the base unit 7; thus, the cover plate 12 stays in place and a disposable cartridge 2 can be placed on the cartridge accommodation site 8 via front-entry loading. Such front-entry loading usually includes a movement of the disposable cartridge 2 in a direction that is parallel to the electrode array 9 (see FIG. 1). In order to enable proper drawing-in of the disposable cartridge 2 and to neatly position the cartridge at the accommodation site 8, the base unit 7 preferably is equipped with insertion guides 25. These insertion guides 25 preferably are from a self-lubricating plastic material, such as tetrafluorethylene and preferably leave a space between them that is just sufficient for slidingly inserting the disposable cartridge 2. Alternatively the electrically conductive material 15 of the cover plate 12 is configured as a metal plate, a metal foil, or a metal layer that is sandwiched between materials of the top substrate 13 (see FIG. 8A).

The disposable cartridge 2 of FIG. 3 comprises a bottom layer 3, a top layer 4, and a spacer 5 that defines a gap 6 between the bottom and top layers 3,4 for manipulating samples in liquid droplets 23 in this gap 6. The bottom layer 3 and the top layer 4 comprise a hydrophobic surface 17 that is exposed to the gap 6 of the cartridge 2. The bottom layer 3 and the top layer 4 of the cartridge 2 are entirely hydrophobic films or at least comprise a hydrophobic surface that is exposed to the gap 6 of the cartridge 2. As a difference to the one depicted in FIG. 2, this cartridge 2 has dielectric layer 24 that is attached to or forms a part of the bottom layer 3. Thus, the bottom layer 3 is covered by a dielectric layer 24 or the bottom layer 3 itself is made from a dielectric material. In consequence, the electrode array 9 does not need to have such a dielectric layer 24. The spacer 5 of the cartridge 2 here at least partially is configured as a body that includes compartments 21 for reagents needed in an assay that is applied to the sample droplets in the gap 6. In this case, the electrode array 9 is covered by a dielectric layer 24.

The electrode array 9 is fixed to a bottom substrate 11 and every individual electrode 10 is electrically and operationally connected with the central control unit 14 (only three connections of the ten electrodes 10 are drawn here). The electrode array 9 is located on an immovably fixed bottom substrate 11. The digital microfluidics system 1 is configured for manipulating samples in liquid droplets 23 within disposable cartridges 2 that contain a gap 6. Accordingly, the samples in liquid droplets 23 are manipulated in the gap 6 of the disposable cartridge 2.

The cover plate 12 also includes a piercing facility 18 that is configured for introducing sample droplets into the gap 6 of the cartridge 2. The piercing facility 18 is configured as a through hole 19 that leads across the entire cover plate 12 and that enables a piercing pipette tip 20 to be pushed through and pierce the top layer 4 of the cartridge 2. The piercing pipette tip 20 may be a part of a handheld pipette (not shown) or of a pipetting robot (not shown). The cover plate 12 here comprises additional piercing facilities 22 for a piercing pipette tip 20 to be pushed through a through hole 19 that penetrates the cover plate 12, to pierce the top layer 4 of the cartridge 2 and to withdraw reagent portions from the compartments 21 and for introducing said reagent portions into the gap 6 of the cartridge 2. Here, the compartment 21 is configured as a cutout in the body of the spacer 5, the cutout being closed by the bottom layer 3 and top layer 4.

Like in the already introduced first and second embodiments, the disposable cartridge 2 comprises a bottom layer 3, a top layer 4, and a spacer 5 that defines a gap 6 between the bottom and top layers 3,4 for manipulating samples in liquid droplets 23 in this gap 6. The bottom layer 3 and the top layer 4 comprise a hydrophobic surface 17 that is exposed to the gap 6 of the cartridge 2. The $1^{st}$ hydrophobic surface 17' is located on the inside of the bottom layer 3, and the $2^{nd}$ hydrophobic surface 17" is located on the inside of the top layer 4. The bottom layer 3 and the top layer 4 of the cartridge 2 are entirely hydrophobic films or at least comprise a hydrophobic surface that is exposed to the gap 6 of the cartridge 2. It is clear from this FIG. 2, that the cartridge 2 does not have a conductive layer. The spacer 5 of the cartridge 2 here does not deed to be configured as a body that includes compartments 21 for reagents needed in an assay that is applied to the sample droplets in the gap 6, because these reagents could be added to the gap 6 by conventional pipetting with a handheld pipette or with a pipetting robot (see above).

Like in the already introduced first and second embodiment, the disposable cartridge 2 comprises a bottom layer 3, a top layer 4, and a spacer 5 that defines a gap 6 between the bottom and top layers 3,4 for manipulating samples in liquid droplets 23 in this gap 6. The bottom layer 3 and the top layer 4 comprise a hydrophobic surface 17 that is exposed to the gap 6 of the cartridge 2. The $1^{st}$ hydrophobic surface 17' is located on the inside of the bottom layer 3, and the $2^{nd}$ hydrophobic surface 17" is located on the inside of the top layer 4. The bottom layer 3 and the top layer 4 of the cartridge 2 are entirely hydrophobic films or at least comprise a hydrophobic surface that is exposed to the gap 6 of the cartridge 2. It is clear from this FIG. 2, that the cartridge 2 does not have a conductive layer. The spacer 5 of the cartridge 2 here does not deed to be configured as a body that includes compartments 21 for reagents needed in an assay that is applied to the sample droplets in the gap 6, because these reagents could be added to the gap 6 by conventional pipetting with a handheld pipette or with a pipetting robot (see above).

The FIG. 4 shows an overview over a digital microfluidics system 1 that is equipped with a central control unit 14 and a base unit 7, with twelve cartridge accommodation sites 8 that each may comprise a fixed cover plate 12. This base unit 7 is particularly suited for taking up cartridges 2 according to a sixth embodiment and loading these cartridges into substantially vertical cartridge accommodation sites 8 with a substantially vertical electrode array 9 and cover plate 12 (see FIG. 5). Such loading preferably is carried out by a robotized gripping device of a liquid handling workstation (not shown).

According to the present invention, this digital microfluidics system 1 also comprises twelve board accommodation sites 40 for receiving a swappable electrode board 41 that each comprises an electrode array 9. In this exemplary embodiment of FIG. 4, all cartridge accommodation sites 8 and board accommodation sites 40 are grouped in pairs, the board accommodation sites 40 being located immediately below the cartridge accommodation sites 8. These pairs of cartridge accommodation sites 8 and board accommodation sites 40 are here arranged in four columns and three rows; the upper cartridge accommodation site 8 of the right column being void of a disposable cartridge 2, which is shown on the right outside the base unit 7. In addition, the middle cartridge accommodation site 8 and board accommodation site 40 are void of a disposable cartridge 2 and of swappable electrode board 41 as well, which again are shown on the right outside the base unit 7.

The FIG. 5 (see FIG. 5A and FIG. 5B) shows section views of one exemplary cartridge accommodation site 8 of a base unit 7 of digital microfluidics system 1 with a disposable cartridge 2 according to a sixth embodiment accommodated therein. It is immediately clear from the FIG. 5A, that a top-entry cartridge 2 is inserted into a substantially vertical cartridge accommodation site 8 with a substantially vertical electrode array 9 and cover plate 12. This disposable cartridge 2 comprises a bottom layer 3 and a top layer 4, and a spacer 5 that defines a gap 6 between the bottom and top layers 3,4 for manipulating samples in liquid droplets 23 in this gap 6. The bottom layer 3 and the top layer 4 comprise a hydrophobic surface 17',17" that is exposed to the gap 6 of the cartridge 2. The bottom layer 3 and the top layer 4 of the cartridge 2 are entirely hydrophobic films or at least comprise a hydrophobic surface that is exposed to the gap 6 of the cartridge 2. Like the one depicted in FIG. 2, this cartridge 2 has no dielectric layer attached to or forms a part of the bottom layer 3. In consequence, the electrode array 9 does need to have such a dielectric layer 24. This cartridge 2 preferably is filled with silicon oil.

The electrode array 9 is fixed to a bottom substrate 11 (that itself is immovably fixed inside the base unit 7) and every individual electrode 10 is electrically and operationally connected with the central control unit 14 (only four connections of the fourteen electrodes 10 are drawn here). The digital microfluidics system 1 is configured for manipulating samples in liquid droplets 23 within disposable cartridges 2 that contain a gap 6. Accordingly, the samples in liquid droplets 23 are manipulated in the gap 6 of the disposable cartridge 2.

The cover plate 12 is mechanically connected with or entirely integrated into the base unit 7 of the digital microfluidics system 1 and is not movable. Thus, a disposable cartridge 2 can be inserted into the cartridge accommodation site 8 via front entry loading that in this situation of FIGS. 5A and 5B is actually to be called top-entry loading (compare to FIG. 4). Here, the electrically conductive material 15 of the cover plate 12 is made of metallic conductive material and is sandwiched between material of the top substrate 13. Alternatively, the electrically conductive material 15 of the cover plate 12 may be covered by a plastic layer instead or additional to the material of the top substrate 13 (not shown).

The spacer 5 also includes a piercing facility 18 that is configured for introducing sample droplets into the gap 6 of the cartridge 2. The piercing facility 18 is configured as an enlarged portion of the spacer 5. This enlarged spacer portion preferably is equipped with a pierceable, self-sealing membrane 31 that enables a piercing pipette tip 20 to be pushed through. The piercing pipette tip 20 may be a part of a handheld pipette (not shown) or of a pipetting robot (not shown). Automated delivery of liquids to or withdrawal of liquids from the gap 6 of the cartridge 2 is simplified by the relatively large piercing area provided by this enlarged spacer portion of the cartridge 2. Assuming a gap width of about 1-3 mm, the width of this piercing area preferably is about 5-10 mm and therefore has about the size of a well of 96-well microplate, which easily can be reached by an automated pipettor of a liquid handling system or of a liquid handling workstation. The same time as providing space for compartments 21 (see also FIG. 5B), the enlarged spacer portion of the cartridge 2 also provides gripping surfaces for being gripped by an automated robot gripper (not shown) that is preferably utilized for handling the cartridges outside of the digital microfluidics system 1 and for inserting and withdrawal of the cartridges 2 from their accommodation sites 8. In addition, the enlarged spacer portion of the cartridge 2 provides an abutting surface that abuts the surface of the base unit 7 when the cartridge 2 is correctly accommodated in the accommodation site 8.

Similar to the insertion and withdrawal of a disposable cartridge 2 into and from the respective cartridge accommodation site 8, a swappable electrode board 41 can be inserted and withdrawn to and from the respective board accommodation site 40. Moreover, it is important to note that similar or deviating from their so far shown and discussed spatial orientation, these accommodation sites 8,40 can be orientated in all arbitrary spatial orientations as long as the cartridge accommodation sites 8 and board accommodation sites 40 are located so close to each other that a disposable cartridge 2 that is inserted into its accommodation site 8 operably touches with its bottom layer 3 the surface of the respective swappable electrode board 41 (i.e. the surface of the electrode array 9 or the surface of the dielectric layer 24 on top of the electrode array 9 of the respective swappable electrode board 41).

It is preferred that the electrode array 9 extends to the foremost position with respect to the surface of the base unit 7 in order to be able to move liquid droplets 23 from a compartment 21 to a distinct position on the printed circuit board (PCB) or electrode array 9. Also moving liquid droplets 23 in the opposite direction from a reaction site on the electrode array 9 to a compartment 21 is greatly preferred, especially in the case if a reaction product shall be analyzed outside of the digital microfluidics system 1 and also outside of the cartridge 2.

FIG. 5B shows the top-entry cartridge 2 of FIG. 5A as viewed from the section plane B indicated in FIG. 5A. The section runs through the gap 6 and between the bottom layer 3 and the top layer 4 of the self-containing, disposable cartridge 2. The section also crosses the spacer 5, of which a U-shaped part is located between the bottom and top layers 3,4 and an enlarged spacer portion is provided around the U-shaped part and the bottom and top layers 3,4. Preferably, the U-shaped part of the spacer 5 is of plastic material (preferably injection molded) and glued or fused to the bottom and top layers 3,4. It is preferred that the enlarged spacer portion also is produced by injection molding; this enables the provision of separating bars 32 that on the one hand create the compartments 21 below the pierceable membrane 31, and that on the other hand stabilize the pierceable membrane 31. Such stabilization preferably is provided by back-injection molding the separating bars 32 and the enlarged spacer portion to the pierceable membrane 31. Preferably, the enlarged spacer portion then is imposed on the U-shaped part of the spacer 5 with the bottom and top layers 3,4.

As already pointed out, the spacer 5 preferably also includes a piercing facility 18 that is configured as an enlarged portion of the spacer 5. This enlarged spacer portion preferably is equipped with a pierceable self-sealing membrane 31 that enables a piercing pipette tip 20 to be pushed through. The piercing pipette tip 20 may be a part of a handheld pipette (not shown) or of a pipetting robot (not shown). The spacer 2 here comprises additional piercing facilities 22 for a piercing pipette tip 20 to be pushed through the self-sealing membrane 31 and to withdraw e.g. silicon oil from the gap 6 of the cartridge 2. In the cartridge 2 of this FIG. 5B, a liquid droplet 23 (e.g. a sample) was introduced by the piercing pipette tip 20 at the piercing facility 18 and then moved on the hydrophobic surface 17' of the bottom layer 3 to the actual position. Simultaneously with introducing the liquid droplet 23 into the compartment 21 and into the gap 6, a similar amount of silicon oil (or any other chemically inert liquid that will not mix with the liquid droplet 23) is withdrawn from the respective compartment 21 at the additional piercing facility 22. Alternative to such simultaneous balancing of liquids in the gap 6, removing of the expected quantity of oil or inert liquid can be carried out shortly before or after the insertion of the liquid droplet 23. The compartments 21 also may serve as reservoirs for storing more liquid than necessary for producing a movable liquid droplet 23 from this liquid; in consequence, a number of such droplets 23 may be produced from a single liquid volume once introduced into at least one of the compartments 21. It is advisable however, to set aside one compartment 21, for withdrawal of oil or inert liquid, and to set aside another compartment 21 for withdrawal of reagent products.

According to an alternative and very simple embodiment (not shown), a disposable cartridge 2 that comprises a bottom layer 3 and top layer 4 with hydrophobic surfaces 17',17" that in each case are directed to the gap 6, can be mounted on a PCB for electrowetting, whether the PCB is configured as swappable or not. Instead of utilizing a cover plate 12 that is equipped with an electrically conductive material 15, an electrically conductive film (e.g. an aluminum foil) can be attached to the outer surface of the top layer 4. It turned out that such a conductive film enables electrowetting even when this conductive film in not grounded. Instead of attaching an un-grounded conductive film to the cartridge, the top layer 4 can have a thin film coating on its outer surface; the thin film coating can be of any metal and deposited by chemical or physical evaporation techniques. This thin conductive film on the outer surface of the top layer 4 can even by of conductive paint. It is thus proposed to provide an electrically conductive material 15 that extends in a second plane and substantially parallel to the electrode array 9, said electrically conductive material 15 being situated on the top layer 4 of the cartridge 2 and being not connected to a source of a distinct electrical potential during manipulating samples in liquid droplets 23.

FIG. 6 shows an overview over a swappable electrode board 41 that is insertable into a board accommodation site 40 of a digital microfluidics system 1. The bottom substrate 11 of this swappable electrode board 41 is configured as a printed circuit board (PCB). This top view shows a similar layout of an electrode array 9 like the printed circuit board (PCB) of a system for liquid droplet manipulation as disclosed in the patent application Ser. No. 13/188,584, which has been filed by the present applicant on Jul. 22, 2011 and published as US 2013/0020202 A1 (the content of which being herein incorporated in its entirety). This particular electrode array 9 of the system 40 is configured for receiving a disposable cartridge 2 on top of it. This electrode array 9 is particularly configured to match for the lysis of cellular material, for the extraction and PCR amplification of DNA fragments, for the hybridization experiments for genotyping, and for optical detection. Different to the PCB disclosed in US 2013/0020202 A1 however, the bottom substrate 11 of this electrode array 9 is not irremovably fixed to the base unit 7 of the digital microfluidics system 1. Here the bottom substrate 11 and electrode array 9 are parts of a swappable electrode board 41 that is removably insertable into a board accommodation site 40 of a digital microfluidics system 1.

When all the experiments and measurements are completed, the cartridge 2 (together with the samples and the waste in it) is safely discarded so that nobody of the laboratory personnel is endangered by its contents. Then, it may be decided carrying out a similar assay with similar or other samples, but utilizing the same swappable electrode board 41 with its dedicated electrode array 9. In this case, the next disposable cartridge 2 is pressed onto the electrode array 9 and the next experiments can be performed. Alternatively, it may be decided to carry out other experiments for which the present swappable electrode board 41 with its dedicated electrode array 9 it not particularly useful. In this alternative case, another swappable electrode board 41 with a different electrode array 9 that better suits the experiments or assays that are to be carried out is selected. Thus, the now selected swappable electrode board 41 comprises an electrode array 9 that is configured for carrying out the particular alternative assay or experiment within the gap 6 of the cartridge 2, during which assay or experiment samples in liquid droplets 23 that adhere to a hydrophobic surface 17 are manipulated within the gap 6 by electrowetting.

In the FIG. 6 (see on top and on the bottom of the Figure), a large number of contact points, i.e. electrical board contact elements 42 are seen. Individual electric lines (not shown here for better clarity of the drawing) contact each individual electrode 10 with one of these electrical board contact elements 42. In addition, heaters located in the bottom substrate 11 of the swappable electrode board 41 are also connected to some of these electrical board contact elements 42. All electrical board contact elements 42 are connected by physical touch with an appropriate number of electrical base unit contact elements 43 with the central control unit 14 of the digital microfluidics system 1, which central control unit 14 controls all necessary activations of e.g. heaters, piercing facilities 18 etc. and of all electrical potentials of the electrodes 10 that are required. On each side of the electrode array 9 and close to the borders 44 of the PCB 11 is also provided a separate contact point for contacting with a ground potential source of the central control unit 14. Board contact elements 42 may be located close to one or more borders 44 of the PCB 11, depending on the physical need and on the method of entering the swappable electrode board 41 into its board accommodation site 40 of a digital microfluidics system 1.

The swappable electrode board 41 shown is configured to be placed at one of the board accommodation sites 40 of a digital microfluidics system 1, e.g. as shown in FIG. 1 or 4. In each case, the electrical board contact elements 42 of the swappable electrode board 41 are configured to engage with the electrical base unit contact elements 43 of the base unit 7 that are electrically connected to the central control unit 14 of the digital microfluidics system 1. Preferably, the bottom substrate 11 that supports the electrode array 9 is configured as a printed circuit board (PCB), the electrical board contact elements 42 being located in groups and close to one or more borders 44 of the PCB. It is especially preferred that the individual electrodes 10 of the electrode array 9 are arranged and configured for manipulating liquid droplets within cartridges 2 by electrowetting and for carrying out a particular assay or experiment.

FIG. 7 shows a section detail according to FIG. 2; here however, the electrode array 9 is located on a swappable electrode board 41 according to a first embodiment of electrically contacting, according to which the electrical board contact elements 42 are configured as rigid plates or knolls that substantially extend on at least one border 44 of the bottom substrate 11 in a direction perpendicular to the first plane in which the least one electrode array 9 of the swappable electrode board 41 substantially is extending. Preferably for taking up such a swappable electrode board 41, the multitude of electrical base unit contact elements 43 that are electrically connected to the central control unit 14 of the digital microfluidics system 1 are configured as flat springs that substantially extend vertically and are resilient in a horizontal direction for safely and individually engaging the number of electrical board contact elements 42 of a swappable electrode board 41 that are electrically connected to the individual electrodes 10.

FIG. 8 shows a section detail according to FIG. 3; here however, the electrode array 9 is located on a swappable electrode board 41 according to a second embodiment of electrically contacting, according to which the electrical board contact elements 42 are configured as rigid plates or knolls that substantially extend on a lower side and close to a border 44 of the bottom substrate 11 in a direction parallel to the first plane in which the least one electrode array 9 substantially is extending. Preferably for taking up such a swappable electrode board 41, the multitude of electrical base unit contact elements 43 that are electrically connected to the central control unit 14 of the digital microfluidics system 1 are configured as resilient or resiliently supported pins that substantially extend vertically and are resilient in a vertical direction for safely and individually engaging the number of electrical board contact elements 42 of a swappable electrode board 41 that are electrically connected to the individual electrodes 10. As shown, common (here vertically arranged) or individual (here horizontally arranged) insertion guides may facilitate safe and exact insertion as well as easy removal of disposable cartridges 2 and/or swappable electrode board 41 into and from the respective accommodation sites 8,40.

FIG. 9 shows a schematic view of a generic multi level "instrument platform", i.e. a digital microfluidics system 1 that comprises a standardized base unit 7 with all common modules that are always needed when liquid droplets are to be manipulated by electrowetting. Such modules e.g. comprise a digital/analog (D/A) board 45, a high voltage relay module 46, a cartridge clamping module 47 or a vacuum mechanism 49 (with O-ring 53) for fixing a cartridge 2 on a swappable PCB 41, embedded software 51 preferably loaded into a control unit 14 in the base unit 7, and a graphics user interface (GUI) 52 preferably configured as a touch screen.

Optional modules such as an optics module 48 for the analysis (one-sided optical detection of e.g. fluorescence or transmissive optical detection of absorbance) of samples contained in liquid droplets 23 or a magnet actuator module 50 for attracting magnetic beads may be integrated into all digital microfluidics systems 1 or only on request. Such an "instrument platform" for carrying out a series of particular experiments or assays preferably is configured as a stand-alone instrument that further comprises a set of replaceable PCBs and replaceable cartridges that are adapted for the respective experiments or assays.

Different arrangements of the electrical board contact elements 42 and electrical base unit contact elements 43 are within the selection of a skilled person that is reading the present application.

A method for manipulating samples in liquid droplets 23 that adhere to a hydrophobic surface 17 may comprise the steps of providing a first hydrophobic surface 17' on a bottom layer 3 of a disposable cartridge 2. This bottom layer 3 is located substantially parallel above an electrode array 9 of a digital microfluidics system 1. Said electrode array 9 substantially extends in a first plane and comprises a number of individual electrodes 10 that are supported by a bottom substrate 11 of a base unit 7 of the digital microfluidics system 1. Said electrode array 9 is connected to a central control unit 14 of the digital microfluidics system 1 for controlling the selection of individual electrodes 10 of said electrode array 9 and for providing these electrodes 10 with individual voltage pulses for manipulating said liquid droplets 23 on said first hydrophobic surface 17' by electrowetting. The method may also comprise the step of providing a second hydrophobic surface 17" substantially parallel to and in a distance to said first hydrophobic surface 17'. In this way, a gap 6 between the first and second hydrophobic surfaces 17',17" is formed. Preferably, such a gap 6 is defined by a spacer 5, to which the a bottom layer 3 that comprises the first hydrophobic surface 17' and a top layer 4 that comprises the second hydrophobic surface 17" are attached. The method may further comprise providing a cover plate 12 with a top substrate 13. The cover plate 12 also comprises an electrically conductive material 15 that extends in a second plane and substantially parallel to the electrode array 9. It is especially preferred that the electrically conductive material 15 of the cover plate 12 is not connected to a source of a distinct electrical potential during manipulating samples in liquid droplets 23.

In all embodiments shown or discussed, it is preferred that the gap 6 of the disposable cartridge 2 is substantially filled with silicon oil. It is also always preferred that the bottom layer 3 and the top layer 4 of the cartridge 2 are entirely hydrophobic films or comprise a hydrophobic surface 17', 17" that is exposed to the gap 6 of the cartridge 2. Following electrowetting and manipulating at least one liquid droplet 23 with the gap 6 of a disposable cartridge 2, the result of the manipulation or of the assay can be evaluated while the disposable cartridge 2 still is at the cartridge accommodation site 8, i.e. utilizing an analysis system of the digital microfluidics system 1 or of a workstation, the digital microfluidics system 1 is integrated into. Alternately, the disposable cartridges 2 can be taken out of the base unit 7 of the digital microfluidics system 1 and analyzed elsewhere.

After analysis, the disposable cartridges 2 can be disposed and the electrode array 9 can be reused. Because the components of the digital microfluidics system 1 never come into contact with any samples or reagents when working with the first or second embodiment of the cartridge 2, such re-usage with other disposable cartridges 2 can be immediately and without any intermediate cleaning. Because the through hole 19 of the cover plate 12 of the digital microfluidics system 1 may come into contact with samples and reagents when working with the third or fourth embodiment of the cartridge 2, such re-usage with other disposable cartridges 2 can be carried out after some intermediate cleaning or after replacement of the cover plates 12.

It is an aim of the present invention to provide removable and disposable films that separate the liquid droplets 23 from the electrode array 9 and from the top plate 12 during manipulation of the liquid droplets 23 by electrowetting. As shown in the six different embodiments of the self-containing disposable cartridge 2 presented in the above specification, the removable and disposable films preferably are provided as a bottom layer 3 and a top layer 4 of a cartridge 2.

In a preferred embodiment, the bottom layer 3 of the cartridge 2 is attracted to the PCB by vacuum. Small evacuation holes in the PCB are connected to a vacuum pump for this purpose. Applying such vacuum attraction to the bottom layer 3 enables avoiding the use of any liquids or adhesives for better contacting the bottom layer 3 of the cartridge 2 to the surface of the electrode array 9.

Any combination of the features of the different embodiments of the cartridge 2 disclosed herein that appear reasonable to a person of skill are comprised by the gist and scope of the present invention.

Even if they are not particularly described in each case, the reference numbers shown in the Figures refer to similar elements of the digital microfluidics system 1 and swappable electrode board 42 of the present invention.

REFERENCE NUMBERS

| | |
|---|---|
| 1 | digital microfluidics system |
| 2 | disposable cartridge |
| 3 | bottom layer |
| 4 | top layer |
| 5 | spacer |
| 6 | gap between 3 and 4 |
| 7 | base unit |
| 8 | cartridge accommodation site |
| 9 | electrode array |
| 10 | individual electrode |
| 11 | bottom substrate, PCB |
| 12 | cover plate |
| 13 | top substrate |
| 14 | central control unit |
| 15 | electrically conductive material |
| 16 | hinge |
| 17 | hydrophobic surface |
| 17' | $1^{st}$ hydrophobic surface |
| 17" | $2^{nd}$ hydrophobic surface |
| 18 | piercing facility |
| 19 | through hole |
| 20 | piercing pipette tip |
| 21 | compartment |
| 22 | additional piercing facility |
| 23 | liquid droplet |
| 24 | dielectric layer |
| 25 | insertion guide |
| 26 | disposable pipette tip |
| 27 | piercing pin |
| 31 | pierceable membrane |
| 32 | separating bar |
| 40 | board accommodation site |
| 41 | swappable electrode board |
| 42 | electrical board contact elements |
| 43 | electrical base unit contact elements |
| 44 | PCB border |
| 45 | D/A I/O board |
| 46 | HV relay module |
| 47 | cartridge clamping module |
| 48 | optics module |
| 49 | vacuum mechanism |
| 50 | magnet actuator module |
| 51 | embedded software |
| 52 | GUI |
| 53 | O-ring |

What is claimed is:

1. A digital microfluidics system (1) for manipulating samples in liquid droplets within gaps (6) of disposable cartridges (2), the digital microfluidics system (1) comprising:
   (a) a base unit (7) with:
      at least one cartridge accommodation site (8) that is configured for taking up a disposable cartridge (2); and
      at least one board accommodation site (40), which is located at said at least one cartridge accommodation site (8),
      which is configured to take up a swappable electrode board (41), and
      which comprises a multitude of electrical base unit contact elements (43) that are electrically connected to a central control unit (14), the electrical base unit contact elements (43) being configured to engage with electrical board contact elements (42) of a swappable electrode board (41) that is placed at said board accommodation site (40);
   (b) at least one disposable cartridge (2), which comprises a bottom layer (3) with a first hydrophobic surface (17'), a top layer (4) with a second hydrophobic surface (17"), and which contains a gap (6) between the hydrophobic surfaces (17',17") of the bottom and top layers (3,4) that are exposed to said gap (6),
      wherein the bottom layer (3) and the top layer (4) are attached to each other, or wherein said disposable cartridge (2) further comprises a spacer (5) that defines the gap (6),
      and
      which is configured to be positioned at said at least one cartridge accommodation site (8);
   (c) at least one swappable electrode board (41), which comprises at least one electrode array (9) with a number of individual electrodes (10) and a number of electrical board contact elements (42) that are electrically connected to said individual electrodes (10) of said electrode array (9), which electrode array (9) substantially extends in a first plane, being supported by a bottom substrate (11) of the swappable electrode board (41) and providing a contact surface to the bottom layer (3) of said at least one disposable cartridge (2); and
   (d) the central control unit (14) for controlling the individual electrodes (10) of said at least one electrode array (9) of said at least one swappable electrode board (41) for manipulating liquid droplets within said gap (6) of said disposable cartridge (2) by electrowetting;
   wherein said at least one cartridge accommodation site (8) and board accommodation site (40) are located so close to each other that said at least one disposable cartridge (2) is fixed on said at least one swappable electrode board (41) when said disposable cartridge (2) is inserted into its accommodation site (8) and operably touches with its bottom layer (3) said contact surface of said at least one swappable electrode board (41) that is inserted into its board accommodation site (40), and
   wherein the bottom layer is a film that is removable from said contact surface of said at least one swappable electrode board.

2. The digital microfluidics system (1) of claim 1, wherein the at least one board accommodation site (40) is located below one of said at least one cartridge accommodation site (8) of the base unit (7).

3. The digital microfluidics system (1) of claim 2, wherein the multitude of electrical base unit contact elements (43) that are electrically connected to said central control unit (14) of the digital microfluidics system (1) are configured as flat springs that substantially extend vertically and are resilient in a horizontal direction for safely and individually engaging the number of electrical board contact elements (42) of a swappable electrode board (41) that are electrically connected to the individual electrodes (10).

4. The digital microfluidics system (1) of claim 2, wherein the multitude of electrical base unit contact elements (43) that are electrically connected to said central control unit (14) of the digital microfluidics system (1) are configured as resilient or resiliently supported pins that substantially extend vertically and are resilient in a vertical direction for safely and individually engaging the number of electrical board contact elements (42) of a swappable electrode board (41) that are electrically connected to the individual electrodes (10).

5. The digital microfluidics system (1) of claim 2, wherein the least one board accommodation site (40) is configured to take up a swappable electrode board (41) that is inserted into the base unit (7) of the digital microfluidics system (1) by substantially:
 (a) vertically lowering the swappable electrode board (41) through the respective cartridge accommodation site (8) and into the board accommodation site (40); or
 (b) horizontally sliding the swappable electrode board (41) below the respective cartridge accommodation site (8) and into the board accommodation site (40); or
 (c) horizontally sliding the swappable electrode board (41) below the respective cartridge accommodation site (8) and substantially vertically lifting into the board accommodation site (40).

6. The digital microfluidics system (1) of claim 1, further comprising an integrated optics module (48) for the analysis of samples contained in liquid droplets (23) that are manipulated within said gap (6) of said at least one disposable cartridge (2).

7. The digital microfluidics system (1) of claim 1, wherein said disposable cartridge (2) further comprises a spacer (5) that at least partially is configured as a body that includes compartments (21) for reagents needed in an assay or experiment that is applied to sample droplets in the gap (6).

8. The digital microfluidics system (1) of claim 1, wherein the bottom layer (3) of said disposable cartridge (2) is covered by a dielectric layer (24) or the bottom layer (3) itself is made from a dielectric material.

9. The digital microfluidics system (1) of claim 1 further comprising at least one cover plate (12) with a top substrate (13), the at least one cover plate (12) being located at said at least one cartridge accommodation site (8).

10. The digital microfluidics system (1) of claim 9, wherein the at least one cover plate (12) further comprises an electrically conductive material (15), which extends in a second plane and substantially parallel to the electrode array (9) of said at least one cartridge accommodation site (8) the at least one cover plate (12) is assigned to, and which electrically conductive material (15) is not connected with a source of an electrical potential.

11. The digital microfluidics system (1) of claim 9, wherein an outer surface of the top layer (4) of the disposable cartridge (2) has an electrically conductive film attached or a film coating deposited thereon; the electrically conductive film or the film coating being not connectable to a source of a distinct electrical potential.

12. The digital microfluidics system (1) of claim 9, wherein the at least one cover plate (12) is configured to apply a force to a disposable cartridge (2) that is accommodated at the cartridge accommodation site (8) of the base unit (7).

13. The digital microfluidics system (1) of claim 1 further comprising an integrated magnet actuator module (50) for attracting magnetic beads.

14. The digital microfluidics system (1) of claim 1, wherein the bottom substrate (11) of said swappable electrode board (41) that supports said electrode array (9) is configured as a printed circuit board (PCB), the electrical board contact elements (42) being located in groups at one or more borders (44) of the PCB.

15. The digital microfluidics system (1) of claim 1, wherein the electrical board contact elements (42) of said swappable electrode board (41) are configured as rigid plates or knolls that substantially extend on at least one border (44) of the bottom substrate (11) in a direction perpendicular to the first plane in which the least one electrode array (9) of the swappable electrode board (41) substantially is extending.

16. The digital microfluidics system (1) of claim 1, wherein the electrical board contact elements (42) of said swappable electrode board (41) are configured as rigid plates or knolls that substantially extend on a lower side at border (44) of the bottom substrate (11) in a direction parallel to the first plane in which the least one electrode array (9) substantially is extending.

17. The digital microfluidics system (1) of claim 1 wherein said swappable electrode board (41) comprises an electronic chip and dedicated software for carrying out a particular experiment or assay, wherein the electronic chip and dedicated software of this swappable electrode board (41) are configured for automatically updating software contained in said base unit (7) of said digital microfluidics system (1) when inserting said at least one swappable electrode board (41) into said base unit (7) of said digital microfluidics system (1).

18. The digital microfluidics system (1) of claim 1 wherein at least said electrode array (9) of the swappable electrode board (41) is covered by a dielectric layer (24).

19. The digital microfluidics system (1) of claim 1, which comprises the base unit as a standardized base unit (7), a digital/analog (D/A) board (45), a voltage relay module (46), and for fixing the disposable cartridge (2) on the swappable PCB (41):
 a cartridge clamping module (47), or
 a vacuum mechanism (49).

20. The digital microfluidics system (1) of claim 1 wherein said swappable electrode board (41) is configured to be placed at said at least one board accommodation site (40) of the digital microfluidics system (1); the electrical board contact elements (42) being configured to engage with the electrical base unit contact elements (43) of said base unit (7) that are electrically connected to said central control unit (14) of said digital microfluidics system (1).

21. The digital microfluidics system (1) of claim 1, which is configured as a stand-alone instrument that further comprises a set of the swappable electronic boards (41) and disposable cartridges (2) that are adapted for a series of particular experiments or assays.

22. The digital microfluidics system (1) of claim 1, wherein the disposable cartridge (2) is a self-contained disposable cartridge.

23. The digital microfluidics system of claim 1, wherein the gap is substantially filled with silicon oil or a non-polar filler fluid.

* * * * *